July 17, 1928.　　　　　　　　　　　　　　　　　　1,677,528
E. F. NORTHRUP
ROTARY FIELD INDUCTION FURNACE
Filed March 12, 1924
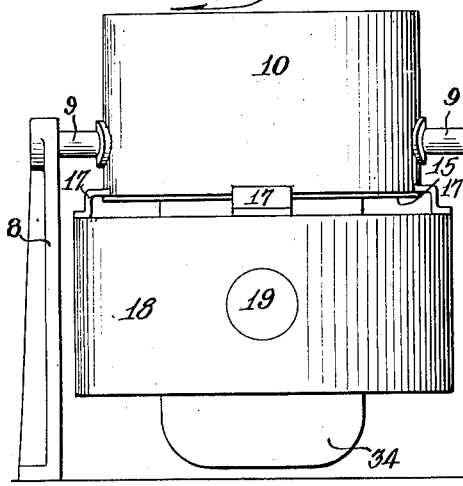
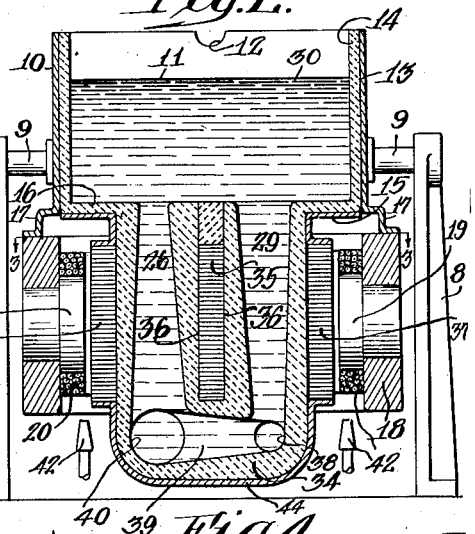
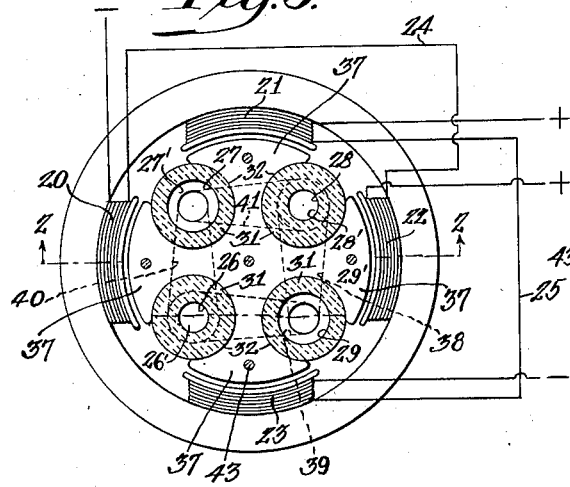
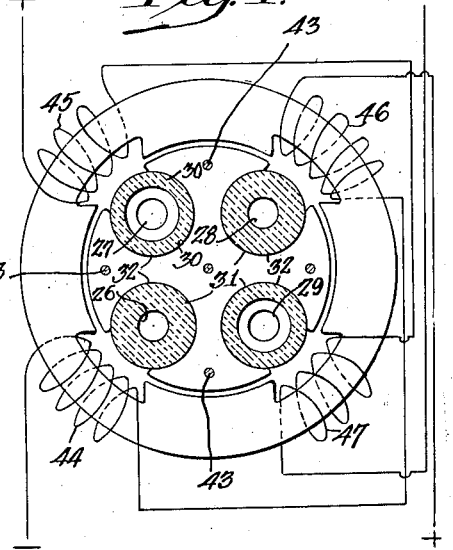
Inventor
Edwin F. Northrup
by
Attorney.
Witness:
Walter Chism Patented July 17, 1928.

1,677,528

UNITED STATES PATENT OFFICE.

EDWIN F. NORTHRUP, OF PRINCETON, NEW JERSEY, ASSIGNOR TO THE AJAX METAL COMPANY, OF PHILADELPHIA, PENNSYLVANIA, A CORPORATION OF PENNSYLVANIA.

ROTARY-FIELD INDUCTION FURNACE.

Application filed March 12, 1924. Serial No. 698,579.

My invention relates to induction furnaces containing a pool of molten metal and a molten resistor beneath it and connecting with it for heating and stirring purposes.

The main purpose of my invention is to accomplish the stirring within the channels and to generate the current within them by the rotary field of what is, in effect, a stalled polyphase electric motor having molten armature conductors.

A further purpose is to apply the rotary field effect of a multiphase current to metal within channels whose walls upon the sides toward which the field rotates are at an angle other than the perpendicular with the plane within which the field rotates, preferably sloping different ways in different channels to give unidirectional flow, up in one and down in another.

A further purpose is to apply to the channels of an electric furnace the drag of a rotating field upon molten metal in a stalled armature combined with pinch effect, preferably to produce unidirectional flow of the molten metal.

A further purpose is to connect generally vertical channels at the top by a pool and at the bottom by a pool or by channels and to rotate a multiphase field about them.

A further purpose is to provide upwardly and downwardly directed passages terminating at the top in a pool and connected at the bottom preferably with passages and these passages flaring in opposite directions in order to secure circulation up in one of the channels and down in another when a rotary field induction is applied to them.

A further purpose is to permit separation of the stator field and stator armature in an induction furnace based upon the principle of a stalled motor.

A further purpose is to utilize the drag of a rotating field to cause movement of molten metal at an angle to the planes in which the field rotates.

A further purpose is to strengthen the furnace and improve the interthreading of the circuits by iron by burying the channels in iron.

A further purpose is to form an ironbound induction furnace secondary in which the secondary can be lifted out of the primary if desired and in which the refractory can be inserted within the iron either as tubes or cylinders, cemented to the adjoining structure or can be rammed in place.

Further purposes will appear in the specification and in the claims.

My invention is directed not only to the methods or processes involved but also to apparatus shown by which they may be carried out.

I have preferred to illustrate my invention by but one general form, with a minor variation in the mechanical application of the winding, selecting a form which is practical and effective and which at the same time well illustrates the principles involved.

Figure 1 is a rear elevation of a furnace embodying the preferred form of my construction, using one form of winding.

Figure 2 is a vertical section of Figure 3 upon line 2—2.

Figure 3 is a section of Figure 2 taken upon line 3—3.

Figure 4 is a section corresponding to Figure 3 of the preferred form but showing a different type of winding.

In the drawings similar numerals indicate like parts.

I have shown conventional standards 8 in which are pivoted trunnions 9 for the body 10 of my furnace containing a pool 11. Though the inner part could obviously be made removable from the outer part for pouring purposes, if desired, I prefer to handle them together, swinging both about the trunnions for pouring through any spout 12. The body of the furnace comprises an outer casing 13, lining 14 and floor construction of casing and lining at 15 and 16.

The outer casing is extended at 17 to support any suitable field, here a ring 18 having inwardly directed pole pieces 19 wound at 20, 21, 22 and 23. The winding is such that coils 20 and 22 are grouped together and coils 21 and 23 are grouped together upon different sides 24 and 25 of a two-phase circuit. Any field construction and winding would serve the purpose which is suitable for use with induction motors and which presents inwardly directed poles. The frequency may also be greatly varied, from commercial frequencies as low as or lower than 60 cycles, to frequencies of the order of 1000. 500 would give good practical results of high efficiency.

Within the field is the equivalent of a stalled armature for an induction motor having molten conductors 26, 27, 28 and 29 filling channels 26', 27', 28' and 29', here arranged in pairs having alternating upward and downward taper, so that channels 26' and 28' in the illustration are tapered to flare downwardly from the pool 30 whereas channels 27' and 29' are tapered to flare upwardly into communication with the pool.

The channels are defined or outlined by heat insulation of any suitable refractory 31.

For convenience in construction and uniformity, all of the channel refractories are shaped as tubes, preferably cylinders 32. Though there is an advantage in forming the cylinders separately and then setting them in place with suitable cement to avoid leakage, smoothness of the channel and freedom from lines of separation make it desirable generally to ram the refractory as a paste into a form and in position, the iron core hereinafter described serving as part of the form. This makes the channel lining a unit with the bottom 16 of the pool and the bottom portion 34 beneath the channels. I have therefore illustrated the latter form. In either event the space between the channel refractories (linings) is filled with a laminated core 35 of soft iron having openings 36 for the refractory. Outside the refractory openings the iron core terminates in poles 37 closely adjacent to the poles of the field.

It will thus be seen that the construction may be likened to a stalled induction motor in which the molten metal in the channels provides the armature conductors in squirrel-cage arrangement united at the upper end by the pool and at the lower end by a pool or preferably by connecting passages filled with molten metal and shown at 38, 39, 40 and 41.

The connections of the field are such as to progressively rotate the field causing pressure between the magnetic field of the stator and the magnetic field of the current induced in the molten metal within the channels, tending to press the metal bodily in the direction of rotation of the field.

It will be obvious that the construction permits the poles of the iron in what I have likened to the armature to be extended circumferentially about the tubular refractories almost into contact with each other, giving an almost continuously surrounding body of iron outside of these refractories and also filling up of the space between them by the iron. Since the field poles also can be extended circumferentially almost into contact and the field poles and armature poles may be brought into comparatively close juxtaposition with a very large area for magnetic flux, the reluctance of the path from field to armature poles will be quite low.

As there is no actual rotation of the parts and the field could be, and in some instances would be laminated as well as the iron of the armature, the iron of field and armature could theoretically be integral, the poles of field and armature being united at the gaps shown. However, there are advantages in being able to construct them separately and integral construction offers the objection of excessive heating of the iron of both. The gap prevents heat conduction through the metal and permits passage of cooling air from any suitable air blast typified by nozzles 42, which blast cools both the field poles, reducing its temperature and the temperature of the coils and the armature poles keeping down to more reasonable limits the temperature of the armature iron.

The number of phases of the current will, of course, preferably bear an aliquot relation to the number of molten channel conductors as will be well understood in the induction motor art.

The passages 38, 39, 40 and 41 shown in the bottom of the "armature" section as connecting the several channels, are shown as tapering alternately so as to connect the larger end of one tapered channel at its bottom with the smaller end of the reversely tapered adjoining channels.

The laminations of the "armature" core are held together by bolts 43 and any exposed parts of the refractory are protected by metal casings, interrupted as in the case of all of the casings to prevent current flow about them.

In the form shown in Figure 4 the structure is of the same general character as seen in Figure 3 but a different form of field winding is used in which coils 44, 45, 46 and 47 are connected with coils 44 and 46 in the one side of a two-phase circuit and coils 45 and 47 in the other side of the circuit, this being merely another form of two-phase field winding, of which many forms are available.

The rotation of the field is in planes parallel to the paper in Figures 3 and 4. Though the axes of the tapered channels are perpendicular to these planes the sides of the channels in the direction of rotation of the field are at an angle to these perpendiculars providing tapered or sloping walls against which the "conductors" are forced by the torque upon the conductors. Tapering of the conductors is of course not the only way in which this slope may be attained and a part of the value of my invention would be secured by the pressure upon the wall alone without any slant or slope of the wall—taking advantage of the pressure as is done in the case of the pressure from pinch or motor effect—but by tapering the additional advantage of unidirectional flow is facilitated and the flow is helped by the pinch pressure resulting from the tapering of the channels.

With application of the current to the field the flux from each phase successively threads the loops 27—28, 26—29 and then threads the loops 27—26 and 28—29.

Whatever the form of armature and field motor relation by which the field tends to rotate the fluid conductors forming the armature winding, the torque produced brings pressure to bear upon the molten metal comprising the conductor tending to rotate it, which pressure is rendered more effective by the sloping of the forward side of the wall. Moreover with the reversely sloping form of channel illustrated, preferably tapered, the flow may be controlled and made unidirectional, combining the torque effect of the stalled motor pair with the pinch effect within the channels themselves. The tendency of flow is from points of smaller cross section to points of larger cross section, within the control of the designer by variation in the length, extent of taper and total size of cross section as well as the electrical elements of the design.

It will be evident that with my disclosure those skilled in the art will be able to obtain all or a part of my invention without copying it and it is my intention to claim all modifications and changes which come within the reasonable spirit and scope of my invention.

Having thus described my invention, what I claim as new and desire to secure by Letters Patent is:—

1. In operating an induction furnace having a pool and molten metal resistors within channels connected at the bottom beneath the pool and connected with the pool, the method which consists in utilizing a surrounding rotary induction field to induce current within the resistors and using the resultant torque upon the resistors to drive the metal against the channel walls so as to cause circulation along the lengths of the resistors.

2. In operating an induction furnace having a pool and molten metal resistors within channels connected at the bottom beneath the pool and connected with the pool, the method which consists in utilizing a surrounding rotary induction field to induce current within the resistors and using the resultant torque upon the resistors to drive the metal against the channel walls in a direction inclined to the lengths of the channels, so as to cause circulation along the lengths of the resistors.

3. In operating an induction furnace having a pool and molten metal resistors within channels connected at the bottom beneath the pool and connected with the pool, the method which consists in utilizing a surrounding rotary induction field to induce current within the resistors and using the resultant torque upon the resistors to drive the metal against the channel walls in a direction inclined to the lengths of the channels, so as to cause circulation along the lengths of the resistors but in opposite directions in different channels.

4. In operating an induction furnace having a pool and molten metal resistors within channels connected at the bottom beneath the pool and connected with the pool, the method which consists in utilizing a surrounding rotary induction field to induce current within the resistors and using the resultant torque upon the resistors to drive the metal against the channel walls in a direction inclined to the lengths of the channels, so as to cause circulation along the lengths of the resistor but in opposite directions in different channels and in assisting the flow by pinch effect by varying the cross section of the channels to enlarge the section in the direction of fluid flow.

5. The method of improving the circulation characteristics in an induction furnace containing molten metal within a pool and channels downwardly extending therefrom and connecting at the bottom, which consists in forming the channels with reversely sloping sides and rotating an induction field about the metal in the channels to induce current in the metal and to drag the metal against the sloping walls of the channels by the torque produced.

6. The method of operating an induction furnace containing molten metal within a pool and channels downwardly extending therefrom and connecting at the bottom, which consists in dragging the metal toward sloping channel walls by rotating an induction field about the metal in the channels in the direction of the intended pressure against the walls.

7. The method of improving the circulation characteristics in an induction furnace containing molten metal within a pool and channels downwardly extending therefrom and connecting at the bottom, which consists in interspersing material permeable to magnetism between the channels, terminating it in poles, producing a magnetic field in the permeable material and across the channels and rotating the magnetic field in a direction toward the channel walls.

8. The method of improving the circulation characteristics in an induction furnace containing molten metal within a pool and channels extending downwardly therefrom and connecting at the bottom, which consist in providing the channels with sloping walls, interspersing material permeable to magnetism between the channels, producing a magnetic field in the permeable material and across the channels, and rotating the magnetic field in a direction toward the sloping channel walls.

9. The method of improving the circulation characteristics in an induction furnace having channels connected with the pool at one end of each and at the other ends connected together, which consists in providing alternate channels with oppositely sloping walls and in rotating a magnetic field about the channels moving in a circumferential direction toward the sloping channel walls.

10. In operating an induction furnace having a molten metal pool and molten metal in channels connected at the bottom beneath the pool and connected with the pool at the top, the method which consists in applying pinch at the top of one of two connected channels and at the bottom of the other channel to give unidirectional flow and in rotating a magnetic field across the channels.

11. In operating an induction furnace having a molten metal pool and molten metal in channels connected at the bottom beneath the pool and connected with the pool at the top, the method which consists in applying pinch at the top of one of two connected channels and at the bottom of the other channel to give uni-directional flow by reversely tapering the channels and at the same time maintaining and progressively rotating a magnetic field between the channels.

12. The method of stirring molten metal in channels beneath and connected with a furnace pool, which consists in uniting the torque caused by a rotary induction field about the channels with the pinch effect caused by a difference in cross section between the top and bottom of the channels to cause flow of molten metal in the same direction.

13. The method of improving the stirring qualities in a furnace containing molten metal in channels beneath and connected with a furnace pool and beneath it with each other, which consists in reversely tapering different channels to give unidirectional pinch effect flow and intensifying the flow of metal therein by applying the torque of a rotary induction field to both channels.

14. The method of improving heating and stirring capabilities in an induction furnace having a pool, channels from and beneath the pool and a core of magnetic material between the channels and terminating in poles, which consist in forming the channels as the conductors of a stalled armature of an induction motor, in providing a fixed induction motor field for said armature poles and conductors and in passing multiphase current through the coils of said field.

15. The method of improving the circulation capabilities in an induction furnace having a pool for molten metal and channels from and beneath the pool united at the bottom which consists in flaring some of the channels upwardly and others downwardly and rotating a magnetic field about the channels to induce current in said channels and cause flow of metal upwardly in the upwardly flaring channels and downwardly in the downwardly flaring channels.

16. An induction furnace having the general characteristics of a stalled induction motor in that it has a field with pole pieces, a field winding and a laminated core and walls forming a pool above the core and channels passing from the pool through the core connecting together at the bottom and whose metal contents correspond with the armature windings of a motor armature.

17. An induction furnace having the characteristics of a stalled induction motor and having the member corresponding to the motor armature comprising a laminated magnetizable core, and walls forming channels passing downwardly through the core, united at the bottom and connecting at their upper ends with a furnace pool, different channels being tapered oppositely.

18. An induction furnace having the characteristics of a stalled induction motor and having the member corresponding to the motor armature comprising a laminated core, walls forming a pool above the core and channels passing downwardly through the core and united at the bottom, successive channels alternately tapered in opposite directions and means for rotating a magnetic field about the channels.

19. In an induction furnace, a fixed induction motor field, a stationary induction motor armature having fluid filled passages for the windings thereof, a core terminating in poles and walls forming a pool above the armature to connect the windings at this point.

20. In an induction furnace, walls forming a pool and a plurality of channels from and beneath the pool connected at their bottoms and having tapered walls, a laminated core extending between said channels and forming poles, and rotary induction means for energizing the poles successively.

21. In an induction furnace, walls forming a furnace pool, and a plurality of spaced downwardly extending channels from and about the pool which are connected at their lower ends, in combination with a laminated core extending between the several joining channels and having poles spaced about and between the channels, a relatively fixed field about the poles, poles for the field, windings for the field poles, and multiphase current supply for the windings.

22. In an induction furnace having channels from and beneath a pool, the method of securing circulation which consists in forming part of the channels with an upward flare and part with a downward flare and inducing electric current flow in the channels having upward and downward maximum flow at different times.

23. In an induction furnace, walls forming a furnace pool, in combination with a plurality of channels downwardly directed from the connection with the pool and united at their lower ends, a core between the channels, extending laterally to form poles opposite the spaces between the channels, a field member having poles corresponding to the poles of the core and multiphase winding for the poles of the field.

24. An induction furnace of the submerged resistor type, a magnetic core between the parts of the resistor and having poles, a field about the core and resistor parts, a winding for the field and alternating current supply for the field winding.

EDWIN F. NORTHRUP.